(No Model.) 2 Sheets—Sheet 1.
A. G. BURTON.
DYNAMOMETER.
No. 304,497. Patented Sept. 2, 1884.
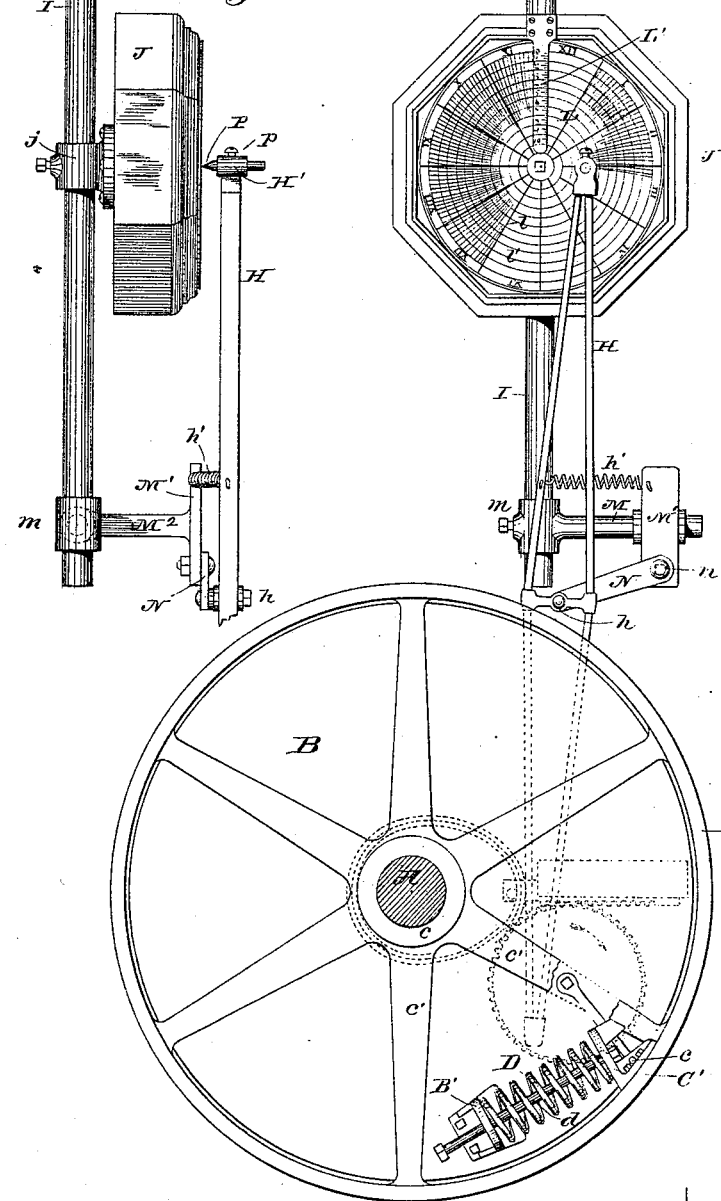
*Fig. 2.*  *Fig. 1.*
WITNESSES
E. W. Adams
C. C. Poole
INVENTOR
Augustus G. Burton
per M. S. Denton
Attorney (No Model.) 2 Sheets—Sheet 2.

A. G. BURTON.
DYNAMOMETER.

No. 304,497. Patented Sept. 2, 1884.

WITNESSES
D. W. Adams
C. C. Poole

INVENTOR
Augustus G. Burton
per M. E. Dayton
Attorney

UNITED STATES PATENT OFFICE.

AUGUSTUS G. BURTON, OF CHICAGO, ILLINOIS.

DYNAMOMETER.

SPECIFICATION forming part of Letters Patent No. 304,497, dated September 2, 1884.

Application filed January 8, 1883. (No model.)

*To all whom it may concern:*

Be it known that I, AUGUSTUS G. BURTON, of Chicago, in the county of Cook and State of Illinois, have invented certain new and useful Improvements in Dynamometers; and I do hereby declare that the following is a full, clear, and exact description thereof, reference being had to the accompanying drawings, and to the letters of reference marked thereon, which form a part of this specification.

This invention relates to improvements in dynamometers as applied to shafting and for the measurement and record of power transmitted. It comprises a spring mechanism interposed between the shaft driven from the main source of power and the pulley mounted on said shaft, from which the power to be estimated is taken, and means for recording the degree of compression to which said spring is subjected from time to time during the day, and, therefore, for determining the amount of power transmitted.

The invention consists in the combinations of mechanisms hereinafter set forth, and pointed out in the claims.

Figure 4:
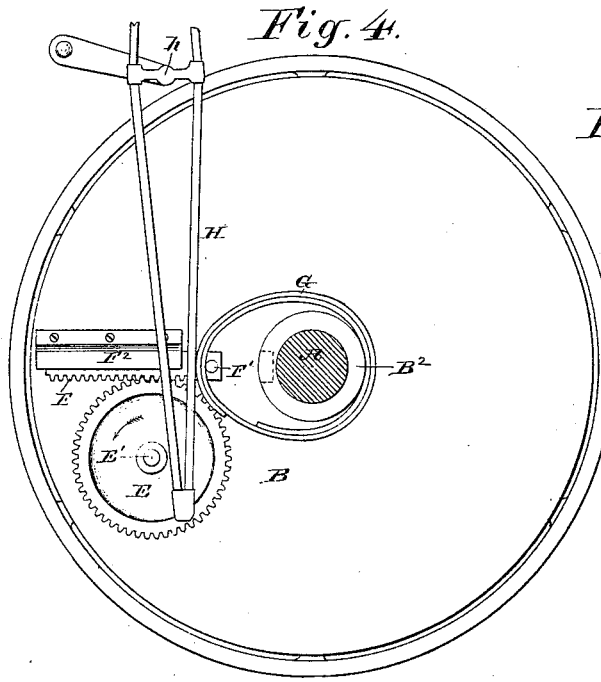
Figure 3:
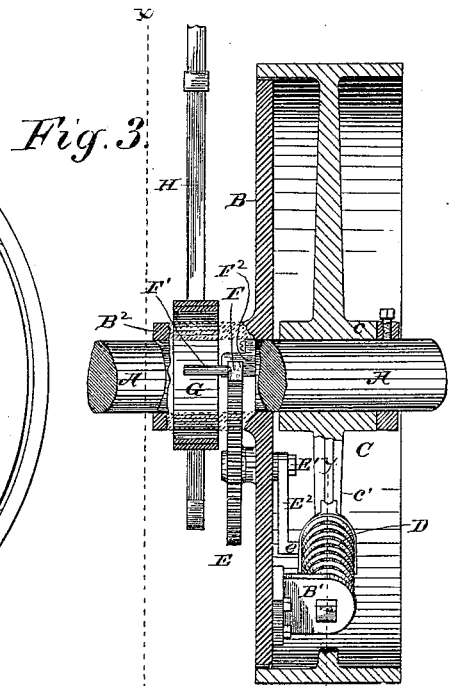
Figure 5:
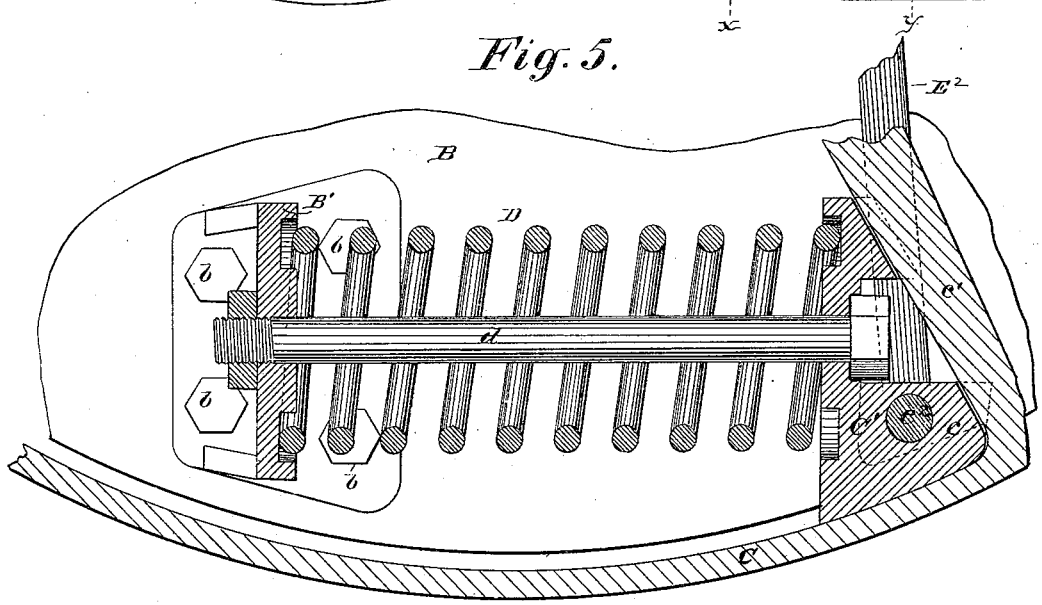

In the drawings, Figure 1 is an elevation of the pulley, the disk attached to the driving-shaft, the interposed spring, the recording-dial, and the intervening mechanism shown by a transverse section of the driving-shaft. Fig. 2 is a side elevation of the clock which bears the recording-dial and of parts of the mechanism by which the record is made thereon. Fig. 3 is a vertical section taken through the axis of the driving-shaft of the driving-disk, the adjacent pulley and other adjacent parts, a portion of the hub of the driving-disk being shown in dotted section lines. Fig. 4 is a side elevation of the disk and pulley seen on the side opposite to that shown in Fig. 1. Fig. 5 is an enlarged detail view in central section of the coiled spring through which power is communicated from the disk to the adjacent pulley.

A is a shaft, which may be understood as being driven from any prime mover, and C is a pulley mounted loosely on said shaft, from which power is to be communicated to other shafting or machinery. The power so communicated from the pulley C is that which is to be estimated or recorded.

B is a disk rigidly secured to the shaft A adjacent to the loose pulley C, as more plainly shown in Fig. 3.

D is an openly-coiled spring of suitable strength, interposed between the disk B and the loose pulley C by means of the bracket B', attached to said disk, and the similar bracket C', attached to the pulley, the axis of the spring being arranged at right angles with the radius passing through the middle. Preferably said disk B is arranged within the rim of the pulley C, and the bracket C' is arranged so as to be supported by one of the arms c', all as indicated in Fig. 3. Through the coiled spring D, and through the brackets B' and C', extends a rod, d, having a head at one end and a nut at the other, arranged externally to the brackets, so as to limit the space between said brackets in order that the spring D may be permanently confined therein. The limit of separation of said brackets as determined by the rod d is such that when the brackets are separated to the full length of the rod the spring will be free from sensible tension; and in order that the spring may under these circumstances retain its position, the brackets B' and C' are annularly recessed to admit the ends of the springs, as indicated in Fig. 5. The rod d is free to move longitudinally through the bracket B'.

It is evident that in this construction and arrangement of the spring D, with reference to the fixed disk B and loose pulley C, when power is applied to the shaft A and resistance to the pulley C, the spring D will be compressed more or less, according to the amount of resistance imposed through said disk, and that, by estimating the tension of the spring at different points of compression, and by the addition of contrivances by which the extent of its compression at different times may be recorded, a record will be obtained of the power communicated from the shaft A to said pulley C. For this purpose the disk B, at a point opposite that end of the spring D which is attached to the pulley, is apertured in a line parallel with the axis of said disk, and a shaft, E', inserted in said aperture, bearing on the pulley side a crank-arm, $E^2$, having its end e horizontally extended and pivoted in the bracket C' at c. On the opposite side of the disk the shaft E' is provided with a fixed pinion, E, which meshes with a radially-arranged rack, F, secured so as to have longitudinal movement on the disk B by means of a flanged guide-plate, $F^2$. On the inner end of the rack F is a projecting pin, F'. (Seen more plainly in Figs. 3 and 4.) About the hub $B^2$ of the disk B is arranged a light, flat, closely-coiled spring, G, having its folds arranged to lie one upon another like those of a watch-spring, as will be clearly understood from said Figs. 3 and 4. Within said spring the pin F' of the sliding rack F is engaged, as seen in Fig. 4. It is now obvious that, in the transmission of power from the shaft A or its fixed disk B to the pulley C, and in the consequent compression of the spring D, while the bracket B' and the shaft E' will maintain a permanent relation to each other, the end $e$ of the arm $E^2$ and the bracket B' will approach each other. This will give a rotary movement to the pinion E in the direction indicated by the arrows, Figs. 1 and 4, and will, therefore, throw the rack F outwardly (toward the periphery of the disk) and correspondingly expand the spring G in the direction of the rack, as seen in Fig. 4 and in dotted lines of Fig. 1. It is also obvious that the lessening of the power transmitted will allow the spring D to expand, and will reverse the motions of the pinion E and the rack F, and will permit the spring G to contract into or toward its normal circular form. As the amount of power transmitted varies from time to time, therefore, the pinion E is oscillated, the rack F is reciprocated, and the external contour and dimensions of the spring G will be changed.

The spring G, changeable in form in the manner and by the means described, constitutes a variable cam for the actuation of an indicating or recording mechanism. In the drawings such a mechanism is shown as consisting of a vibrating lever, H, (pivoted to a suitable support at $h$,) the lower end of which is arranged in contact with the circumferential face of said cam, and the other or upper end of which is provided with a pencil or similar device arranged to move in contact with a rotating graduated dial duly supported in proper position for the purpose.

In the recording mechanism shown I is a cylindric rod, secured by its upper end to the ceiling and depending in the neighborhood of the disk and pulley, as may be understood from Figs. 1 and 2. Upon said rod I is adjustably secured a clock-work, (represented at J,) which actuates a rotating disk having a removable paper face or dial, L, in a plane parallel to that of the pulley C and disk B. Said dial is superficially divided by radial lines $l$ into segments, usually twelve in number, to represent the hours of the working-day, and also divided by concentric circular lines $l'$ into spaces representing horse-powers or other units of power. Below said clock is also adjustably mounted upon the arm I a bracket, M, supporting a vertical head, M', by means of an arm, $M^2$, which may be secured adjustably to the bracket M. To the head M is rigidly secured a second arm, N, on which, at $h$, is pivoted the vibrating lever H. This lever is made light in weight, though rigid, and so pivoted as to vibrate in a plane parallel with the disk B and dial L, and is arranged to bear at its lower end against the circumferential surface of the variable-spring-cam G, as above stated. At the upper end of the lever H is attached a pencil-point, P, in position to bear upon the dial L at one side of its center. A spring, $h'$, connects the lever H, when vertical, with the head M', being so arranged as to throw the lower end of said lever inwardly, in order to maintain constant contact thereof with the surface of the cam G. It is provided that the extreme inward throw of the lower end of the lever H shall carry the pencil-point outwardly to the marginal line on the dial L, and that the extreme compression of the spring D and the corresponding extreme elongation or eccentricity of the spring-cam G shall not carry the pencil-point beyond the center of the dial or its inner line. At each rotation of the shaft A the pencil-point will therefore travel from the outer circular line on the dial inwardly and back, the length of the inward movement being dependent upon the elongation of the spring-cam G, or, in other words, upon the degree to which the spring D is compressed, or upon the correlative amount of power transmitted. When the machinery is at rest, the spring G will be contracted to a circular form, and the pencil-point will stand at the outer circular line of the dial, which represents naught. By suitable tests it is determined how far inward upon the dial the transmission of various definite amounts of power through the spring D will carry the pencil-point D, and the said dial is correspondingly graduated by the series of inner concentric lines, $l'$. A bar, L', arranged in front of the dial, is marked at points opposite said concentric lines, and is numbered toward the center of the dial to denote the horse-powers represented by said concentric lines. The segmental divisions of the dial may be also numbered with the hours of the working-day, as shown.

In the operation of the apparatus the dial is understood to be set in motion at the hour of starting the main shaft in the morning—as, say, at 7 o'clock. Whenever any power is being transmitted through the pulley D, the spring G will be drawn outwardly from the hub $B^2$, and will form a cam, which will vibrate the lever H and mark the face of the dial L. Owing to the relatively slow movement of the dial, the pencil-marks will run together, so as to blacken the face of the dial from the outer circular line inwardly, the inner margin of the blackened surface, by its relation to the adjacent circular lines, representing the amount of power transmitted at any and all times during the day. Ordinarily said inner margin of the blackened surface will be eccentric in accordance with the variations from time to time in the amount of power transmitted, as indicated in Fig. 1 of the drawings.

It is manifest that, except for the sudden blow that would be struck against the lever H by the pin F' at each rotation of the shaft, the spring G might be dispensed with, and it is to avoid this blow and the noise and wear and tear consequent thereon that the said spring is provided. A number of radial slides, F, all connected with and actuated by the one shown might be arranged to draw outwardly on the spring G at several points, so as to preserve a substantially or actually circular form in the latter, whereby the lever H will be vibrated only as the degree of power is changed and not at each rotation of the shaft A. In that case the pencil-point will trace a single line, true or tremulous, according to the perfection of the circle formed by the working-face of the spring G.

It is of course understood that a full or complete disk B is not essential. An arm or partial disk will do as well; but if the latter is employed it should be properly counterbalanced. In any case it will be well to counterbalance the weight of the spring D, pinion E, and other parts secured to the disk or arm at one side of the shaft A.

It will also be understood that instead of a loose pulley applied to the same shaft, A, to which the disk or arm B is secured, motion may be communicated from one shaft to another arranged end to end, an arm or disk on the secondary shaft taking the place of the pulley C or its arm c'. This construction will be the equivalent of that illustrated in the drawings so far as this invention is concerned, inasmuch as the essential idea of the rigid disk and loose pulley, as illustrated and above expressed, is the independent movement of these parts, whereby motion may be communicated from one to the other by means of an interposed spring.

The structure supporting the lever H may, obviously, be less complex than is shown in the drawings. Said lever may be arranged in a horizontal position, in a proper arrangement of the clock and dial with the shaft A, in which case one end of said lever may be weighted and the spring h' dispensed with. So, also, the lever may be provided with a lateral arm for engagement with the variable cam or circle G, and so mounted as to reciprocate longitudinally instead of vibrating. In this case the lever or rod H, if vertical, will be arranged to mark the dial above or below its center.

It is understood that the clock-work may be of any ordinary and well-known construction, and the same is not, therefore, illustrated in detail. A disk fixed to the center-post of an ordinary clock-movement in place of the hour-hand will form a suitable backing for the removable graduated paper dial L, which may be held in place thereon at the center or otherwise in the ordinary ways known in other devices for carrying such dials. Instead of using a pencil-point, which is liable to become worn, a steel or other hard point may be employed. If a more distinct mark than will be made directly by such hard point, is desired, a carbon sheet may be placed beneath the removable paper dial or between two such dials, and said dial or dials will be distinctly blackened. The dial superposed on the carbon sheet will of course be read in the reverse direction as to the time graduation. To obtain a desired pressure of the pencil or stylus P, the spring h' is shown as being arranged to draw the upper end of the lever H inward toward the dial.

Instead of a graduated dial, L, a plain or unmarked sheet may be used, and a transparent plate, as of glass, duly graduated with circular or with both circular and radial lines, may be provided, which will be laid upon the dial to enable the latter to be read.

In addition to the clock mechanism for rotating the disk which supports the dial, a stationary supporting-roller may be arranged beneath said disk on that side against which the pencil or stylus P bears, for the purpose of properly sustaining said disk without strain upon the center-post.

It is of course understood that the power may be transmitted from the pulley C to the shaft A by a mere reversal of the direction of motion.

I claim as my invention—

1. In a dynamometer, the combination, with the relatively-movable rotating parts, from one to the other of which power is communicated, of an expansible part, G, surrounding the axis of motion, and variable in circumference in accordance with the power transmitted, and means for indicating or recording the variations of its expansion, substantially as described.

2. In a dynamometer, the combination, with the spring interposed between the relatively-movable parts, from one to the other of which power is communicated, of an expansible part, G, means for expanding said part in accordance with the tension of the interposed spring, and means for recording the varying expansion of the part G, substantially as described.

3. In a dynamometer, the combination, with a spring interposed between the relatively-movable parts, from one to the other of which power is transmitted, of an expansible part, G, means for expanding the part G in accordance with the tension on the spring, a lever arranged to bear at one end upon the circumferential surface of the part G, a marking device at the opposite end of said lever, and a rotating dial in contact with the marker.

4. In a dynamometer, the combination, with the yielding mechanisms through which the power is transmitted, of a clock-work operating independently of the said power, a rotating dial actuated by said clock-work, and means for continuously recording thereon the amount and variations of power transmitted, substantially as described.

5. The combination, with the variable part

G and with an independent clock-work, of a graduated dial, L, arranged in a plane at right angles with the axis of the part G, and rotated by said clock-work, a centrally-pivoted lever, H, in bearing at one end on the circumferential surface of the part G, and a point attached to the opposite end of said lever in bearings upon the dial at one side of its center of motion, substantially as described.

6. In a dynamometer for shafting, the combination, with working devices actuated in accordance with the power transmitted, of a rotating recording-dial, graduated by radial lines indicating the divisions of time, and by circular concentric lines indicating units of power, substantially as described.

7. In a dynamometer, the combination, with the shaft A, of a fixed disk, B, an independently-movable pulley or arm, C, an interposed spring, D, a shaft, E', mounted in the disk B, a crank-arm, E², on said shaft, having its free end pivotally connected with the part C, a pinion, E, fixed on the shaft E', a rack, F, engaged with said pinion, a projection, F', on said rack, a marking-lever, H, a stationary clock-work, a removable rotating dial, and means for supporting the lever and clock-work in proper relation to the other parts, substantially as described.

In testimony that I claim the foregoing as my invention I affix my signature in presence of two witnesses.

AUGUSTUS G. BURTON.

Witnesses:
M. E. DAYTON,
PETER J. ELLERT.